3,331,863
6 - DIFLUOROMETHYL - 17α - HYDROXYPROGES-
TERONES AND 17-ACYLATES THEREOF
J Allan Campbell, Kalamazoo, Mich., assignor to The
Upjohn Company, Kalamazoo, Mich., a corporation of
Delaware
No Drawing. Filed Oct. 9, 1961, Ser. No. 143,568
6 Claims. (Cl. 260—397.4)

This invention relates to certain novel steroids, more particularly to

6α-difluoromethyl-17α-hydroxy-5α-pregnane-3,20-dione 17-acylates,
1-dehydro-6α-difluoromethyl-17α-hydroxy-5α-pregnane-3,20-dione 17-acylates,
6α-difluoromethyl-17α-hydroxy-4-pregnene-3,20-dione 17-acylates,
6α-difluoromethyl-17α-hydroxy-1,4-pregnadiene-3,20-dione 17-acylates,
6-difluoromethyl-17α-hydroxy-4,6-pregnadiene-3,20-dione 17-acylates,
6-difluoromethyl-17α-hydroxy-1,4,6-pregnatriene-3,20-dione 17-acylates and the unacylated 17α-hydroxy compounds corresponding otherwise thereto.

The compounds of the present invention and processes for their production are illustratively represented by the following sequence of formulae:

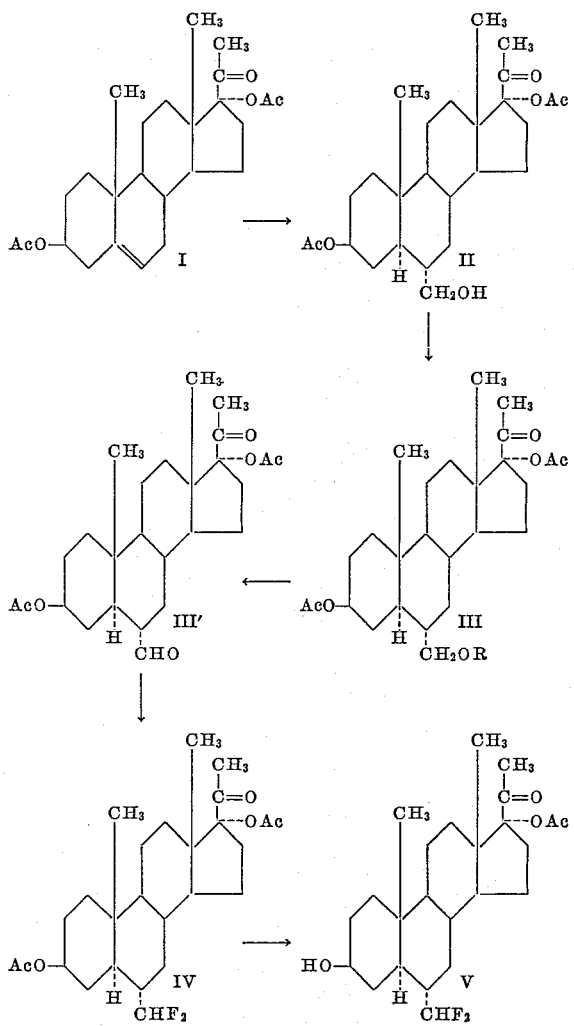

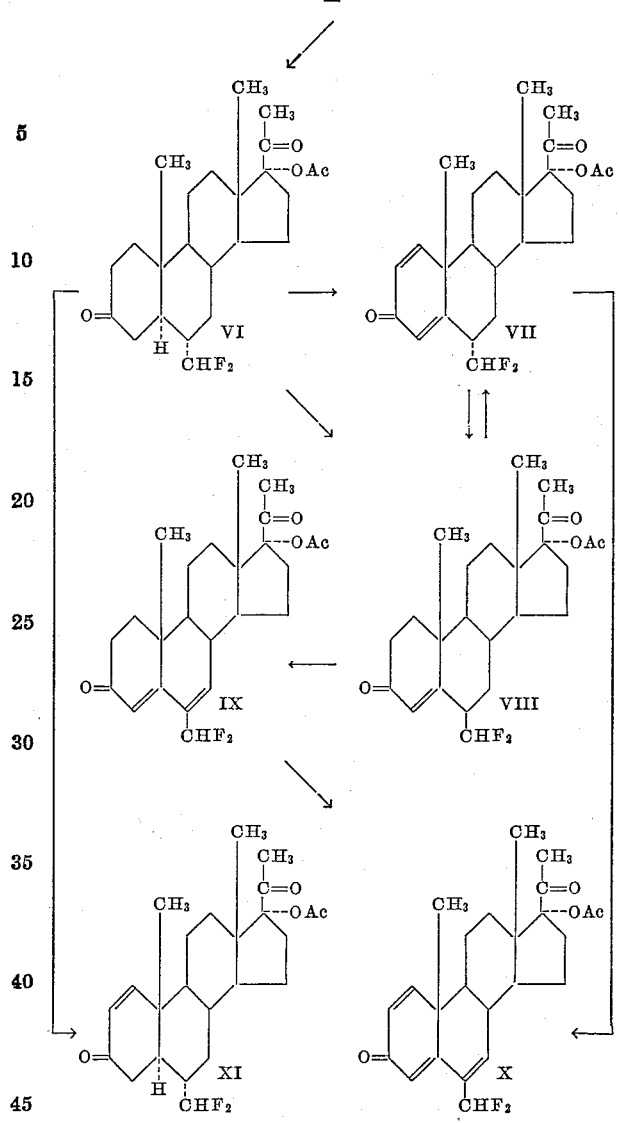

wherein Ac is the acyl radical of an organic carboxylic acid, preferably a hydrocarbon carboxylic acid containing from one to twelve carbon atoms, inclusive, and R is an aryl or alkyl sulfonyl radical containing from one to twelve carbon atoms, inclusive, e.g., lower-alkyl, methyl, aryl, phenyl, p-tolyl, sym. xylyl-sulfonic acid.

As used in this application, the Roman numeral following the name of a compound (or compounds) indicates the relation of the compound (or compounds) to the reaction scheme depicted above.

The novel compounds of this invention,

6α-difluoromethyl-3β,17α-dihydroxy-5α-pregnan-20-one 3,17-diacylates (IV),
6α-difluoromethyl-3β,17α-dihydroxy-5α-pregnan-20-one 17-acylate (V),
6α-difluoromethyl-17α-hydroxy-5α-pregnane-3,20-dione 17-acylates (VI),
1-dehydro-6α-difluoromethyl-17α-hydroxy-5α-pregnane-3,20-dione 17-acylates (XI),
6α-difluoromethyl-17α-hydroxy-4-pregnene-3,20-dione 17-acylates (VIII),
6α-difluoromethyl-17α-hydroxy-1,4-pregnadiene-3,20-dione 17-acylates (VII),
6-difluoromethyl-17α-hydroxy-4,6-pregnadiene-3,20-dione 17-acylates (IX), 6-difluoromethyl-17α-hydroxy-1,4,6-pregnatriene-3,20-dione 17-acylates (X) and the unacylated 17α-hydroxy compounds corresponding otherwise thereto, are highly potent progestational agents, active both orally and parenterally. The compounds represented by Formulae IV to XI, inclusive, are therefore useful as progestational agents either by themselves, or, if desired, in combination with androgens, e.g., 17-methyltestosterone and estrogens (e.g., diethylstilbesterol and ethinylestradiol) in the treatment of humans and valuable domestic animals. They are advantageously employed in the control of such conditions as functional uterine bleeding and dysmenorrhea; they are useful in the maintenance of pregnancy and the regulation of fertility. The compounds embraced by Formulae IV to XI, inclusive, have an improved therapeutic ratio and are useful as antihormonal agents, particularly as anti-estrogens and anti-gonadotropins; they are useful in the treatment of acne. For these purposes, the compounds of this invention can be incorporated and administered to mammals, birds, humans and animals in the various conventional dosage forms, such as pills, tablets, capsules, syrups or elixirs for oral use, or in liquid forms such as suspensions and solutions which are adaptable to the natural and synthetic steroid hormones for injectable products.

The novel compounds of the present invention are prepared from the known 3β,17α-dihydroxy-5-pregnen-20-one 30,17α-diacylates (I) by the following reactions: The 5-pregnene compounds (I) are hydroxymethylated at the 6-position of the non-conjugated double bond by reacting said compounds under conventional "oxo" reaction conditions with carbon monoxide and hydrogen in the presence of a suitable catalyst under pressure to produce a 6α-hydroxymethyl - 3β,17α - dihydroxy-5α-pregnan-20-one 3β,17α-diacylate (II).

The next step of the process of this invention involves reacting a 6α - hydroxymethyl - 3β,17α - dihydroxy-5α-pregnan-20-one 3,17-diacylate (II) with an organic sulfonyl halide such as methanesulfonyl chloride, toluenesulfonyl bromide, benzenesulfonyl chloride, naphthalenesulfonyl chloride, or the like to obtain the corresponding 6-sulfonate ester, e.g., 6α-p-toluenesulfonoxymethyl-3β,17α - dihydroxy - 5α -pregnan - 20 - one 3,17-diacylate (III). Oxidation of the thus produced 6α-tosylate (III) with dimethylsulfoxide yields a 6α-formyl-3β,17α-dihydroxy-5α-pregnan-20-one 3,17-diacylate (III′).

The next step of the process comprises treating the thus obtained 6α - formyl - 3β,17α - dihydroxy-5α-pregnan-20-one 3,17-diacylate (III′) with sulfur tetrafluoride under substantially anhydrous conditions to yield a 6α-difluoromethyl-3β,17α-dihydroxy - 5α - pregnan - 20 - one 3,17-diacylate (IV).

The next step of the process is a hydrolysis employing conventional reagents and conditions in which the above-produced 6α - difluoromethyl - 3β,17α - dihydroxy-5α-pregnan-20-one 3,17-diacylate (IV) undergoes hydrolysis at the 3-position, e.g., by heating with a strong mineral acid in an alkanol, e.g., concentrated sulfuric acid in absolute ethanol or concentrated hydrochloric acid in methanol, to yield a 6α-difluoromethyl-3β,17α-dihydroxy-5α-pregnan-20-one 17-acylate (V).

In the next step of the process, oxidation at the 3-position of the compounds represented by Formula V results in the conversion of the 3β-hydroxy substitutent to a keto group. Oxidation of the aforesaid compounds (V) is carried out by means of oxidizing agents, e.g., sodium dichromate in acetic acid or chromic acid in glacial acetic acid, or under conventional Oppenauer conditions employing an aluminum alkoxide, e.g., aluminum isopropoxide in the presence of a ketone such as acetone or cyclohexanone, to give the corresponding 6α-difluoromethyl - 17α - hydroxy - 5α - pregnane-3,20-dione 17-acrylates (VI).

The step of converting the 6α-difluoromethyl-17α-hydroxy-5α-pregnane-3,20-dione 17-acylates (VI) to 6α-difluoromethyl-17α-hydroxy-1,4-pregnadiene-3,20-dione 17-acylates (VII) can be carried out by several methods, namely, by reacting a compound represented by Formula VI, with a reagent chosen from the group comprising (1) selenium dioxide; (2) dibenzoyloxy selenium oxide in the manner disclosed in German Patent 1,079,630; (3) selenium dioxide in the presence of a metal of the second or eighth group of the periodic system, e.g., magnesium, zinc, cadmium, mercury of Group II or iron, cobalt, nickel of Group VIII as disclosed in U.S. Patent 2,900,398; (4) 2,4-dihalogenating agents, e.g., bromine (2 equivalents) in a medium made acid with hydrobromic acid, followed by dehydrohalogenation, e.g., with lithium chloride and dimethylformamide or with γ-collidine, as disclosed in U.S. Patent 2,838,531, and (5) periodic acid in accordance with the procedure of German Patent 1,042,580.

6α - difluoromethyl - 17α - hydroxy - 1,4-pregnadiene-3,20-dione-17-acylates (VII) can also be prepared (in the manner disclosed by Vischer et al. in Experimentia IX, 371 [1953]) by growing an organism selected from the genus Fusarium, e.g., Fusarium solani and Fusarium caucasicum, in a nutrient medium containing assimilable non-steroidal carbon, nitrogen, and phosphorus, and a compound represented by Formula VI.

6α - difluoromethyl - 17α - hydroxy-5α- pregnane-3,20-dione 17-acylates (VI) can be converted to the corresponding 1-dehydro - 6α - difluoromethyl - 17α - hydroxy-5α-pregnane-3,20-dione 17α-acylates (XI) by reaction with a 2-halogenating agent, e.g., bromine (1 equivalent), followed by dehydrohalogenation, e.g., with lithium chloride and dimethylformamide or with γ-collidine.

The compounds represented by Formula VI can be converted to 6α - difluoromethyl - 17α - hydroxy - 4-pregnene-3,20-dione 17α-acylates (VIII) by 2,4-dihalogenation, e.g., with bromine (2 equivalents) in an acidic medium followed by, dehydrohalogenating the thus-obtained 2,4-dihalo compound with sodium iodide. Alternatively, 6α - difluoromethyl - 17α - hydroxy-4-pregnene-3,20-dione 17-acylates (VIII) can be prepared (in the manner disclosed by Stoudt et al. in Arch. Biochem. and Biophys. 74, 280 [1958]) by growing a microorganism of the genus Nocardia in a nutrient medium containing non-steroidal carbon, nitrogen and phosphorus, and a compound represented by Formula VI.

6α - difluoromethyl - 17α - hydroxy-4-pregnene-3,20-dione 17-acylates (VIII) can be converted to the corresponding 6α - difluoromethyl - 17α - hydroxy-1,4-pregnadiene-3,20-dione 17α-acylates (VII) by fermentation (in the manner set forth in U.S. Patent 2,902,410) with a microorganism of the genus Septomyxa in a nutrient medium containing non-steroidal carbon, nitrogen and phosphorus. Following the same procedure, other microorgansims can be employed instead of Septomyxa; the family Corynebacteriaceae inclusive of the genera Corynebacterium, Listeria and Erysipelothrix, and especially the species Corynebacterium simplex (ATCC 6946) and Corynebacterium hoagii (ATCC 7005), can be used in the 1-dehydrogenation of the compounds embraced by Formula VIII. Alternatively, the compounds represented by Formula VIII can be converted to those of Formula VII by heating at refluxing temperature in a suitable solvent with selenium dioxide, or selenium dioxide in the presence of a metal of the second or eighth group of the periodic system in the manner disclosed in U.S. Patent 2,900,398.

The 17α-hydroxy counterpart of the 6α-difluoromethyl-17α - hydroxy - 1,4 - pregnadiene - 3,20-dione 17-acylates (VII) can be hydrogenated at the 1,2-position by fermentation with a microorganism chosen from the group including ATCC 6947 (Arthrobactertumescens), NRRL–B–1332, ATCC 3352 (S. olivaceous), and ATCC 3313 (S. cellulosae) to yield the compounds of Formula VIII.

The 17-acylates of Formula VII are preferably first hydrolyzed to the corresponding 17α-hydroxy compound (VIIa), e.g., with sodium hydroxide in methanol, before being subjected to the fermentative 1,2-hydrogenation. The 17-acyl group is restored following bioconversion by esterifying the 17α-hydroxy compound (VIIIα) (in the manner set forth in U.S. Patent 2,965,541) with the selected anhydride in the present of an acid catalyst, e.g., p-toluenesulfonic acid, to yield a 6α-difluoromethyl-17α-hydroxy-4-pregnene-3,20-dione 17α-acylate (VIII).

By following the procedure of Example 1 of U.S. Patent 2,889,342, 6α-difluoromethyl-17α-hydroxy-4-pregnene-3,20-dione (VIIIa) can be converted to 3,17α-diacyloxy-6α-difluoromethyl-3,5-pregnadiene-20-ones. 6α-difluoromethyl-17α-hydroxy-4-pregnene-3,20-dione 17α-acylates (VIII) can be converted to 3α,17α-diacyloxy-6α-difluoromethyl-3,5-pregnadiene-20-ones in accordance with the procedure of Example 2 of U.S. Patent 2,889,342.

The 6α-difluoromethyl-17α-hydroxy-4-pregnene-3,20-dione 17-acylates (VIII) can be converted to their corresponding 6-dehydro analogues, i.e., 6α-difluoromethyl-17α-hydroxy-4,6-pregnadiene-3,20-dione 17-acylates (IX) by heating under reflux with chloranil for a period of from about six to about twenty-four hours.

The 17α-hydroxy counterpart of the 6α-difluoromethyl-17α-hydroxy-4,6-pregnadiene-3,20-dione 17-acylates (IX) can be dehydrogenated at the 1,2-position by fermentation with a microorganism of the genus Septomyxa in a nutrient medium containing non-steroidal carbon, nitrogen and phosphorus. The 17-acylate group of the compounds of Formula IX is first hydrolyzed to the corresponding 17α-hydroxy compounds (IXa), e.g., with sodium hydroxide in methanol, before being subjected to the fermentative 1,2-dihydrogenation. The 17-acylate group is restored following bioconversion by esterifying the 17α-hydroxy compound (Xa) with the selected anhydride in the presence of an acid catalyst, e.g., p-toluenesulfonic acid, to yield a 6-difluoromethyl-17α-hydroxy-1,4,6-pregnatriene-3,20-dione 17-acylate (X) as in U.S. Patent 2,965,541. Alternatively, the compounds represented by Formula IX can be converted to those of Formula X by heating at refluxing temperature in a suitable solvent with selenium dioxide, or selenium dioxide in the presence of a metal of the second or eighth group of the periodic system (in the manner of U.S. Patent 2,900,398).

The 1,4,6-pregnatriene compounds represented by Formula X can also be produced from 6α-difluoromethyl-17α-hydroxy-1,4-pregnadiene-3,20-dione 17-acylates (VII) by heating under reflux with chloranil for a period of from about six to about twenty-four hours.

The starting compounds (I) employed in the present process are obtained in the manner disclosed in Preparation 1A of U.S. Patent 2,916,486 by reacting the known 3β,17α-dihydroxy-5-pregnen-20-one (17α-hydroxypregnenelone) with an anhydride of a hydrocarbon carboxylic acid containing from one to twelve carbon atoms, inclusive in the presence of p-toluenesulfonic acid to produce a 3β,17α-dihydroxy-5-pregnen-20-one 3,17-diacylate (I).

All of the 17-acylates embraced by Formulae VI through XI can be converted to the corresponding 17α-hydroxy compounds by saponification. For this purpose the particular 17α-acylate is allowed to react in alcoholic solution at room temperature for a period of from about one to about 24 hours with an alkali metal hydroxide such as sodium hydroxide, potassium hydroxide; an alkali carbonate metal or bicarbonate such as sodium or potassium carbonate, sodium bicarbonate or the like; with an alkaline earth metal hydroxide such as barium or calcium hydroxide.

To isolate the product from the reaction mixture, the latter is first neutralized with aqueous acetic, hydrochloric or sulfuric acid and diluted with water and extracted with a water-immiscible organic solvent such as methylene chloride, chloroform, benzene, ether or the like, and the extracts dried and evaporated to give the crude material. The crude material can then be recrystallized from organic solvents such as methanol, ethanol, acetone, Skellysolve B (hexanes), ethyl acetate, methylene chloride or the like to give the pure 17α-hydroxy counterparts of the compounds represented by Formulae VI through XI. The 17-acylates of the thus obtained compounds are prepared by the esterification thereof, e.g., with the anhydride of the selected acid, in the manner for esterifying difficultly esterifiable 17α-hydroxy steroids disclosed in U.S. Patent 2,805,230, or in Huang Minlon et al., J. Am. Chem., 74, 5394 (1952), i.e., by reacting a steroid containing a tertiary hydroxyl group in the 17α-position with the selected anhydride in the presence of an acid catalyst, e.g., p-toluenesulfonic acid.

All of the compounds embraced by Formulae I through XI can be isolated from their respective reaction mixtures by conventional means, for example, when a water-miscible solvent is used, by pouring the reaction mixture into water and separating the resultant precipitate by filtration. Additional purification of the product can be accomplished by conventional methods, for example, by single solvent elution chromatography from an adsorbent column with a suitable solvent, such as, acetone, methanol, dilute methanol, ethanol, ethylene chloride; also by gradient elution chromatography from an adsorbent column with a suitable mixture of solvents, such as, methylene chloride-Skellysolve B, acetone-Skellysolve B, and the like.

EXAMPLE 1

*6α-hydroxymethyl-3β,17α-dihydroxy-5α-pregnan-20-one 3,17-diacetate (II)*

A mixture of 125 g. of the known compound, 3β,17α-dihydroxy-5-pregnen-20-one 3,17-diacetate (I), 1875 ml. of toluene and 18.75 g. of cobalt carbonate catalyst was placed in a 1 gallon stainless steel autoclave equipped with a mechanical stirrer. The vessel was flushed three times with carbon monoxide and the pressure therein brought to 450 p.s.i. with carbon monoxide, then to 1150 p.s.i. with hydrogen and heated at 180° C. for a period of about 18 hours. The reaction mixture was cooled and filtered through a bed of Celite (diatomaceous earth) and the clear yellow filtrate concentrated to dryness on a rotary evaporator. The residue was triturated with a mixture of ethyl acetate and ether and the crystals collected and washed with ether to yield 71.2 g. of product with a melting point of 225 to 231° C. An additional 4.6 g. was obtained from the mother liquor. A portion of the product was recrystallized from ethyl acetate to yield an analytical sample of 6α-hydroxymethyl-3β,17α-dihydroxy-5α-pregnan-20-one 3,17-diacetate (II) having a melting point of 232 to 234° C. and a rotation $[\alpha]_D$ of −1° (chloroform).

*Analysis.*—Calcd. for $C_{26}H_{40}O_6$: C, 69.01; H, 8.99. Found: C, 69.94; H, 8.72.

EXAMPLE 2

*6α-p-toluenesulfonoxymethyl-3β,17α-dihydroxy-5α-pregnan-20-one 3,17-diacetate (III)*

14.3 g. of p-toluenesulfonyl chloride was added to a solution of 14.3 g. of 6α-hydroxymethyl-3β,17α-dihydroxy-5α-pregnan-20-one 3,17-diacetate (II) in 100 ml. of pyridine. The solution was kept in a cold water bath for a few minutes, then at room temperature for a period of about 18 hours. The solution was then poured into dilute sodium bicarbonate solution and the resulting precipitate collected on a filter, thoroughly washed with water and dried to yield 17.8 g. of product having a melting point of 197 to 208° C. Two recrystallizations from ethyl acetate gave an analytical sample of 6α-p-toluenesulfonoxymethyl-3β,17α-dihydroxy-5α-pregnan-20-one 3,17-diacetate (III), melting at 214 to 216° C. with rotation $[\alpha]_D$ (chloroform) of +1°.

*Analysis.*—Calcd. for $C_{32}H_{44}O_8S$: C, 65.28; H, 7.53; S, 5.45. Found: C, 65.82; H, 7.82; S, 5.23.

EXAMPLE 2A

*6α-formyl-3β,17α-dihydroxy-5α-pregnan-20-one 3β,17α-diacetate (III′)*

A suspension of 20 g. of sodium bicarbonate in 125 ml. of dimethylsulfoxide with nitrogen bubbling therethrough was heated in an oil bath held at a temperature of about 155° C. When the temperature of the suspension reached 135° C., 12.3 g. of 6α-p-toluenesulfonoxymethyl-3β,17α-dihydroxy-5α-pregnan-20 - one 3,17-diacetate (II) was added thereto. The flask containing the suspension was swirled intermittently for a period of about 10 minutes. The reaction mixture was cooled to about 40° C., then poured into ice-water. The amorphous precipitate was collected, washed with water and dried to yield 9.05 g. of product. A 1 g. aliquot of this material was chromatographed through a 100 g. Florisil (synthetic magnesium silicate) column using gradient elution, employing 3 l. of a mixture of Skellysolve B (hexane hydrocarbon) containing 4% acetone and 3 l. of a mixture of Skellysolve B containing 12% of acetone and collecting 250 ml. fractions to yield the desired aldehyde (fractions 13 to 17). The product obtained from these eluates was recrystallized twice from ether to give 0.2 g. of dense crystals of 6α-formyl-3β,17α-dihydroxy - 5α-pregnan-20-one 3,17-diacetate (III′) with a melting point of 170 to 172° C. (decomposition) and rotation [α]$_D$ (chloroform) of +28°.

*Analysis.*—Calcd. for $C_{26}H_{38}O_6$: C, 69.92; H, 8.58. Found: C, 70.01; H, 8.70.

EXAMPLE 3

*6α-difluoromethyl-3β,17α-dihydroxy-5α-pregnan-20-one 3,17-diacetate (IV)*

2 g. of unpurified 6α - formyl - 3β,17α-dihydroxy-5α-pregnan-20-one 3,17-diacetate (III′) in 20 ml. of methylene chloride and 0.2 ml. of water was treated with 40 g. of sulfur tetrafluoride in a stainless steel rocking autoclave at room temperature for a period of about 16 hours. The reaction mixture was washed with sodium bicarbonate solution and water, dried and the solvent removed. The residue was dissolved in methylene chloride and chromatographed through a 175 g. Florisil column packed wet with Skellysolve B and eluted by gradient elution with 4 l. of a mixture of 3% acetone in Skellysolve B and 4 l. of a mixture of 12% acetone in Skellysolve B taking 250 ml. fractions. The desired difluoromethyl compound was eluted in fractions 14 to 21. The residues of these fractions were combined and recrystallized from a mixture of acetone and Skellysolve B to yield 1.15 g. of this material. Recrystallization from the same solvents gave pure light-colored 6α-difluoromethyl-3β,17α-dihydroxy-5α-pregnan-20-one 3,17-diacetate (IV) melting at 154 to 156° C.

*Analysis.*—Calcd. for $C_{26}H_{38}F_2O_5$: C, 66.64; H, 8.17. Found: C, 67.04; H, 8.17.

EXAMPLE 4

*6α-difluoromethyl-3β,17α-dihydroxy-5α-pregnan-20-one 17-acetate (V)*

A solution of 1.9 g. of 6α-difluoromethyl-3β,17α-dihydroxy-5α-pregnan-20-one 3,17-diacetate (IV) was heated at refluxing temperature with 40 ml. of methanol and 0.4 ml. of concentrated hydrochloric acid for a period of about 1 hour. Water was added and most of the methanol evaporated with a fast stream of nitrogen. The resulting precipitate was collected by filtration, washed with water and dried to yield 1.6 g. of product. A small amount of this material was recrystallized from a mixture of acetone and Skellysolve B to yield 6α-difluoromethyl-3β,17α-dihydroxy-5α-pregnan-20-one 17-acetate (V) with a melting point of 197 to 205° C. and a rotation [α]$_D$ (chloroform) of +12°.

*Analysis.*—Calcd. for $C_{24}H_{36}F_2O_4$: C, 67.57; H, 8.51. Found: C, 67.54; H, 8.61.

EXAMPLE 5

*6α-difluoromethyl-17α-hydroxy-5α-pregnane-3,20-dione 17-acetate (VI)*

0.9 g. of 6α - difluoromethyl - 3β,17α - dihydroxy-5α-pregnan-20-one 17-acetate (V) was added to a solution of 0.9 g. of sodium dichromate dihydrate in 9 ml. of acetic acid. The solution was stirred for a period of about 5 hours and poured into water. The resulting precipitate was collected by filtration, washed with water and dried. It was chromatographed through a 75 g. column of Florisil previously packed wet with Skellysolve B; gradient elution of the product was carried out with mixtures of 3 l. of 2% acetone in Skellysolve B and 3 l. of 12% acetone in Skellysolve B taking 250 ml. fractions. Fractions 22 to 27 gave 0.6 g. of the 3-ketone melting at 188 to 192° C. after recrystallization from acetone. A small portion of this material was again recrystallized from acetone to yield pure light-colored 6α-difluoromethyl-17α-hydroxy-5α-pregnane-3,20-dione 17-acetate (VI) having a melting point of 192 to 193° C. and a rotation [α]$_D$ (chloroform) of +17°.

*Analysis.*—Calcd. for $C_{24}H_{34}F_2O_4$: C, 67.90; H, 8.07. Found: C, 68.10; H, 8.34.

EXAMPLE 6

*6α-difluoromethyl-17α - hydroxy-1,4′ - pregnadiene-3,20-dione 17-acetate (1-dehydro-6α-difluoromethyl-17α-hydroxyprogesterone 17-acetate) (VII)*

A mixture of 1.6 g. of 6α-difluoromethyl-17α-hydroxy-5α-pregnane-3,20-dione 17-acetate (VI), 2.1 g. of selenium dioxide, 2.5 g. of mercury, 4.2 ml. of acetic acid and 150 ml. of t-butyl alcohol was heated with refluxing under nitrogen for a period of about 24 hours. An additional 2 g. of selenium dioxide was added to the reaction mixture and after about 24 hours of further heating at reflux temperature, the mixture was concentrated to a volume of about 75 ml., diluted with methylene chloride and filtered through a bed of Celite. The filtrate was washed successively with water, freshly prepared ammonium sulfide solution, dilute ammonium hydroxide solution and several times with water. Each aqueous phase was back extracted with methylene chloride. The extracts were combined, dried, filtered and concentrated to dryness. The residue was dissolved in a small amount of methylene chloride and chromatographed through a column of Florisil. Recrystallization of the residues obtained by evaporation of the eluates containing the desired product from the mixture of acetone and Skellysolve B, yielded 0.3 g. of material melting at 233 to 234° C. A further recrystallization from acetone-Skellysolve B gave pure 6α-difluoromethyl-17α - hydroxy-1,4-pregnadiene-3,20-dione 17-acetate (VII) having a melting point of 234 to 234.5° C., rotation [α]$_D$ (chloroform) of 0°, $$\lambda_{max}^{alc.}\ 243\ m\mu\ (\epsilon = 16,400)$$

*Analysis.*—Calcd. for $C_{24}H_{30}F_2O_4$ (420.48): C, 68.55; H, 7.19; O, 15.22. Found: C, 68.44; H, 7.23; O, 15.77.

EXAMPLE 6A

*6α-difluoromethyl-17α-hydroxy-1,4-pregnadiene-3,20-dione 17-acetate (VII)*

A mixture of 1 g. of 6α-difluoromethyl-17α-hydroxy-5α-pregnane-3,20-dione 17-acetate (VI), 20 ml. of t-butanol and 1.5 g. of dibenzoyloxy selenium oxide was heated with a water trap and reflux condenser for a period of about 12 hours. After cooling, the selenium compound was removed by filtration and the filtrate evaporated under vacuum. The residue was taken up in ethyl acetate, the extract washed with aqueous sodium carbonate solution, water, and dried with wood charcoal. The extract was chromatographed over a 125 g. column of Florisil and eluted with fractions of Skellysolve B containing increasing portions of acetone. The fractions containing the typical $\Delta^{1,4}$-3-ketone system (as shown by infrared analysis) were combined, evaporated to dryness and the thus obtained residue recrystallized twice from methanol to yield pure light-colored crystalline 6α-difluoromethyl-17α-hydroxy-1,4-pregnadiene-3,20-dione 17-acetate (VII).

EXAMPLE 7

*6α-difluoromethyl-17α-hydroxy-1,4-pregnadiene-3,20-dione 17-acetate (VII)*

A solution containing 320 mg. of bromine in 15 ml. of glacial acetic acid was added with slow stirring to 410 mg. of 6α-difluoromethyl-17α-hydroxy-5α-pregnane-3,20-dione 17-acetate (VI), dissolved in 300 ml. of acetic acid to which was added 0.1 ml. of 4 N hydrogen bromide solution in acetic acid. The mixture was allowed to stand overnight and resulted in the precipitation of a crude product which was recovered by filtration, washed with water and dried. The crude material was recrystallized from a mixture of ethyl acetate and Skellysolve B to give pure light-colored 2,4-dibromo-6α-difluoromethyl-17α-hydroxy-5α-pregnane-3,20-dione 17-acetate (VI'). A solution of 100 mg. of the thus obtained 2,4-dibromo compound (VI') in 1 ml. of redistilled dimethylformamide and 100 mg. of lithium chloride was heated for a period of about 2 hours. The reaction mixture was then cooled, poured into cold water and the aqueous solution extracted with methylene chloride. The methylene chloride extract was washed thoroughly with water, dried over anhydrous sodium sulfate and concentrated in volume. The extract was chromatographed over a 25 g. column of Florisil and eluted with fractions of Skellysolve B containing increasing proportions of acetone. The fractions showing an ultraviolet absorption at $$\lambda_{max.}^{alc.} \ 243 \ m\mu$$

were combined, evaporated to dryness and the thus obtained residue recrystallized twice from methanol to give pure light-colored 6α-difluoromethyl - 17α - hydroxy-1,4-pregnadiene-3,20-dione 17-acetate (VII).

The following procedure sets forth an alternative method of dehydrohalogenating the 2,4-dibromo compound (VI'). 100 mg. of 2,4-dibromo-6α-difluoromethyl-17α-hydroxy-5α-pregnane-3,20-dione 17-acetate (VI') was dissolved in 1 ml. of redistilled γ-collidine and the solution refluxed for a period of about 40 minutes. The reaction solution was then poured into sufficient cold dilute sulfuric acid to bind the base as the sulfate salt, and extracted with methylene chloride. The methylene chloride extract was chromatographed over a 25 g. column of Florisil using Skellysolve B containing increasing proportions of acetone for elution of the column. The fractions exhibiting ultraviolet absorption maxima at 243 mμ were combined and crystallized to yield pure light-colored 6α-difluoromethyl - 17α - hydroxy-1,4-pregnadiene-3,20-dione 17-acetate (VII).

EXAMPLE 7A

*6α-difluoromethyl-17α-hydroxy-1,4-pregnadiene-3,20-dione 17-acetate (VII)*

1 g. of 6α-difluoromethyl-17α-hydroxy-5α-pregnane-3,20-dione 17-acetate (VI) was dissolved in 65 ml. of t-amyl alcohol and 3 ml. of glacial acetic acid. To this solution 400 mg. of periodic acid was added with stirring and heated to about 70° C. After this, during 30 minute intervals, four additional portions of 400 mg. of periodic acid were added to the reaction mixture with stirring and maintenance of the temperature at about 70° C. Heating was continued at this temperature for a period of about 20 hours. The reaction mixture was diluted with 65 ml. of water and 3 g. of sodium sulfate added. The t-amyl alcohol was removed under vacuum and the residue extracted with chloroform. The extract was washed with water, dried over sodium sulfate, heated to dryness on the water bath under vacuum and the solid material taken up in acetone. Recrystallization of the product from acetone yielded pure light-colored crystalline 6α-difluoromethyl-17α-hydroxy-1,4-pregnadiene - 3,20-dione 17-acetate (VII).

EXAMPLE 7B

*6α-difluoromethyl-17α-hydroxy-1,4-pregnadiene-3,20-dione 17-acetate (VII)*

Six 100-milliliter portions of a medium in 250-milliliter Erlenmeyer flasks containing one percent glucose, two percent corn steep liquor (60 percent solids) and tap water was adjusted to a pH of 4.9. This medium was sterilized for 45 minutes at fifteen pounds per square inch pressure and inoculated with a one to two day growth of *Fusarium solani* A.T.C.C. 11712. The Erlenmeyer flasks were shaken at room temperature at about 24 degrees centigrade for a period of three days. At the end of this period, this 600-milliliter volume was used as an inoculum for ten liters of the same glucose-corn steep liquor medium which in addition contained ten milliliters of an antifoam (a mixture of lard oil and octadecanol). The fermentor was placed into the water bath, adjusted to 28 degrees centigrade, and the contents stirred (300 r.p.m.) and aerated (0.5 l. air/10 l. beer). After 17 hours of incubation, when a good growth developed and the alkalinity rose to pH 6.7, two grams of 6α-difluoromethyl-17α-hydroxy-5α-pregnane-3,20-dione 17-acetate (VI) plus one gram of 3-ketobisnor-4-cholen-22-al, dissolved in 115 milliliters of dimethylformamide, was added and the incubation (conversion) carried out at the same temperature and aeration for 48 hours (final pH 7.9). The mycelium was filtered off and the steroidal material was extracted with methylene chloride, the methylene chloride extracts evaporated to dryness, and the resulting residue chromatographed over a Florisil column. The column was packed with 200 grams of Florisil and was developed with five 400-milliliter fractions each of methylene chloride, Skellysolve B-acetone mixtures of 9:1, 8:2, 7:3, 1:1 and methanol. The fraction eluted with Skellysolve B-acetone (7:3) on recrystallization from acetone gave the desired product, 6α-difluoromethyl-17α-hydroxy-1,4-pregnadiene-3,20-dione 17-acetate (VII).

Following the procedure of Example 7B, but instead of *Fusarium solani* A.T.C.C. 11712, employing *Fusarium solani* A.T.C.C. 10915 or *Fusarium caucasicum* No. 5978 of the Fungi Culture Collection of the Institute for Fermentation of Takeda Pharmaceutical Industries, Ltd., Osaka, Japan, is likewise productive of 6α-difluoromethyl-17α-hydroxy - 1,4 - pregnadiene - 3,20 - dione 17-acetate (VII).

EXAMPLE 8

*1-dehydro-6α-difluoromethyl-17α-hydroxy-5α-pregnane-3,20-dione 17-acetate (XI)*

A solution containing 160 mg. bromine in 10 ml. of glacial acetic acid was added with slow stirring to 410 mg. of 6α - difluoromethyl - 17α - hydroxy - 5α - pregnane-3,20-dione 17-acetate (VI), dissolved in 300 ml. of acetic acid to which was added 0.1 ml. of 4 N hydrogen bromide solution in acetic acid. The mixture was allowed to stand overnight and addition of water resulted in the precipitation of a crude product which was recovered by filtration, washed with water and dried. The crude material was recrystallized from a mixture of ethyl acetate and Skellysolve B to give pure light-colored 2 - bromo - 6α - difluoromethyl - 17α - hydroxy - 5α - pregnane - 3,20 - dione 17-acetate (VI''). A solution of 100 mg. of the thus obtained 2-bromo compound (VI'') in 1 ml. of redistilled dimethylformamide and 100 mg. of lithium chloride was heated for a period of about 2 hours. The reaction mixture was then cooled, poured into cold water and the aqueous solution extracted with methylene chloride. The methylene chloride extract was washed thoroughly with water, dried over anhydrous sodium sulfate and concentrated in volume. The extract was chromatographed over a 25 g. column of Florisil and eluted with fractions of Skellysolve B containing increasing proportions of acetone. The fractions showing an ultraviolet absorption at $$\lambda_{max.}^{alc.} \ 229 \ m\mu \ (\epsilon = 9{,}125)$$

were combined, evaporated to dryness and the thus obtained residue recrystallized twice from methanol to give pure light-colored 1 - dehydro - 6α - difluoro - methyl-17α - hydroxy - 5α - pregnane - 3,20 dione 17 - acetate (XI).

The following procedure sets forth an alternative method of dehydrohalogenating the 2-bromo compound (VI''). 100 mg. of 2 - bromo - 6α - difluoromethyl - 17α-hydroxy - 5α - pregnane - 3,20 - dione 17 - acetate (VI'') was dissolved in 1 ml. of redistilled γ-collidine and the solution refluxed for a period of about 40 minutes. The reaction solution was then poured into sufficient cold dilute sulfuric acid to bind the base as the sulfate salt, and extracted with methylene chloride. The methylene chloride extract was chromatographed over a 25 g. column of Florisil using Skellysolve B containing increasing proportions of acetone for elution of the column. The fractions exhibiting ultraviolet absorption maxima at 229 mμ (ϵ=9,125) were combined and crystallized to yield pure light colored 1 - dehydro - 6α - difluoromethyl - 17α-hydroxy - 5α - pregnane - 3,20 - dione 17 - acetate (XI).

EXAMPLE 9

*6α-difluoromethyl-17α-hydroxy-4-pregnene-3,20-dione 17-acetate (VIII)*

410 mg. of 6a - difluoromethyl - 17α - hydroxy - 5α-pregnane - 3,20 - dione 17α - acetate (VI) in 10 ml. of dioxane was acidified with a drop of 4 N hydrogen bromide in dioxane and 320 mg. of bromine added over a period of 1 minute. After a period of about 1 hour at room temperature, an excess of aqueous sodium bicarbonate solution was added to the reaction mixture. The precipitated 2,4-dibromo derivative of 6α-difluoromethyl-17α-hydroxy-5α-pregnan-3,20-dione 17-acetate (VI') was treated with 0.9 g. of sodium iodide in 15 ml. of acetone containing bromoacetone, and the mixture heated at refluxing temperature for a period of about 2.5 hours. 0.3 g. of oxalic acid was then added and heating continued for a period of about 1 hour. After cooling, ethyl acetate was added and the solution filtered. The filtrate was washed with water and sodium bicarbonate solution, then dried with sodium sulfate. The filtrate was stirred with 500 mg. of zinc dust in 2 ml. of acetic acid for about 1 hour and then filtered. The organic layer was washed successively with water, sodium bicarbonate solution and dried with sodium sulfate. Evaporation of the solvent gave the crude α,β-unsaturated ketone, which on purification with a Grignard reagent, followed by subsequent crystallization yielded pure light-colored 6α - difluoromethyl - 17α - hydroxy-4-pregnene-3,20-dione 17-acetate (VIII). Alternatively, if desired, the crude α,β-unsaturated ketone can be purified by chromatography over Florisil with increasing proportions of acetone in Skellysolve B, followed by recrystallization.

EXAMPLE 10

*6α-difluoromethyl-17α-hydroxy-4-pregnene-3,20-dione 17-acetate (VIII)*

A medium consisting of 1% dextrose hydrate, 2% cornsteep liquor of 60% solids and tap water was adjusted to pH 4.9 with sodium hydroxide. The medium was steam sterilized at 15 pounds pressure for about 30 minutes, cooled and then inoculated with a 24 hour growth, from spores, of *Nocardia blackwellii* (NCTC 630 [Medical Research Council of the Lister Institute, London]). The medium was agitated and sparged with sterile air at the rate of one-tenth volume of air per volume of medium per minute. At the end of 24 hours of fermentation at room temperature, the pH was about 7.4. To this culture there was added a solution of 6α - difluoromethyl - 17α - hydroxy - 5α - pregnane - 3,20 - dione 17α - acetate (VI) dissolved in a minimal amount of dimethylformamide. The solution was prepared by dissolving 5 parts of the steroid in 100 parts of the solvent and adding about 10 ml. of the solution per liter of the medium. Fermentation was continued for a period of about 6 hours whereupon the mycelium and beer wer extracted thoroughly with methylene chloride. The extract was washed with sodium bicarbonate solution and then with water, dried and concentrated under vacuum to give 6α - difluoromethyl - 17α - hydroxy-4-pregnene-3,20-dione (VIIIa).

Instead of *Nocardia blackwellii* (NCTC 630 [Medical Research Council of the Lister Institute, London]) used in Example 10 to produce fermentative dehydrogenation at 4,5-position, other microorganisms may be similarly effectively employed; included are those chosen from the group consisting of: ATCC 4275 (*Nocardia convoluta*); ATCC 9604 (*Nocardia gardneri*) and NRRL B-1365 (*Nocardia coeliaca*).

A solution composed of 1 g. of 6α - difluoromethyl-17α - hydroxy - 4 - pregnene - 3,20 - dione (VIIIa), 2.5 ml. of distilled acetic anhydride, 250 mg. of p-toluenesulfonic acid and 2.5 ml. of acetic acid was stirred for a period of about 90 minutes. The mixture was poured with vigorous stirring into water. The precipitated solid was separated by filtration, dried, chromatographed over Florisil with increasing proportions of acetone in Skellysolve B and recrystallized from ethyl acetate to yield light-colored 6α-difluoromethyl-17α-hydroxy-4-pregnene-3,20-dione 17-acetate (VIII).

Substituting another lower-hydrocarbon carboxylic acid anhydride for the acetic anhydride and extending the reaction time is productive of other 6α-difluoromethyl-17α-hydroxy-4-pregnene-3,20-dione 17-acylates (VIII) whereing the acyl radical of the acylate group is the acyl radical of, for example, a lower-aliphatic acid, e.g., formic (formic acid plus acetic anhydride), propionic, butyric, isobutyric, valeric, isovaleric, 2-methylbutyric, 3-ethylbutyric, hexanoic, diethylacetic, decanoic, heptanoic, octanoic, undecanoic, a cyclic acid, e.g., cyclopropylideneacetic, a cycloaliphatic acid, e.g., cyclopentylformic, cyclopentylacetic, β-cyclopentylpropionic, cyclohexylformic, cyclohexylacetic, β-cyclohexylpropionic, an aryl or alkaryl acid, e.g., benzoic, methylbenzoic, dimethylbenzoic, ethylbenzoic, trimethylbenzoic, an aralkyl acid, e.g., phenylacetic, phenylpropionic, and p-hexyloxyphenylpropionic acid.

EXAMPLE 10A

*6α-difluoromethyl-17α-hydroxy-1,4-pregnadiene 3,20-dione 17-acetate (VII)*

Six 100-milliliter portions of a medium in 250-milliliter Erlenmeyer flasks containing one percent glucose, two percent corn steep liquor (60 percent solids) and tap water was adjusted to a pH of 4.9. This medium was sterilized for 45 minutes at fifteen pounds per square inch pressure and inoculated with a one to two day growth of *Septomyxa affinis* A.T.C.C. 6737. The Erlenmeyer flasks were shaken at room temperature at about 24 degrees centigrade for a period of three days. At the end of this period, this 600-milliliter volume was used as an inoculum for ten liters of the same glucose-corn steep liquor medium which in addition contained ten milliliters of an antifoam (a mixture of lard oil and octadecanol). The fermentor was placed into the water bath, adjusted to 28 degrees centigrade, and the contents stirred (300 r.p.m.) and aerated (0.5 l. air/10 l. beer). After 17 hours of incubation, when a good growth developed and the alkalinity rose to pH 6.7, two grams of 6α-difluoromethyl-17α-hydroxy-4-pregnene-3,20-dione 17-acetate (VIII)

plus one gram of 3-ketobisnor-4-cholen-22-al, dissolved in 115 milliliters of dimethylformamide, was added and the incubation (conversion) carried out at the same temperature and aeration for 24 hours (final pH 7.9). The mycelium was filtered off and the steroidal material was extracted with methylene chloride, the methylene extracts evaporated to dryness, and the resulting residue chromatographed over a Florisil column. The column was packed with 200 grams of Florisil and was developed with five 400-milliliter fractions each of methylene chloride, Skellysolve B-acetone mixtures of 9:1, 8:2, 7:3, 1:1, and methanol. The fraction eluted with Skellysolve B-acetone (7:3) on recrystallization from acetone gave the desired product, 6α - difluoromethyl - 17α - hydroxy - 1,4 - pregnadiene-3,20-dione 17-acetate (VII).

Alternatively, 6α - difluoro - methyl - 17α - hydroxy-1,4-pregnadiene-3,20-dione 17-acetate (VII) or the corresponding 17-hydroxy compound can be obtained by dehydrogenation of 6α - difluoromethyl - 17α - hydroxy - 4-pregnene-3,20-dione 17-acetate (VIII) or the corresponding 17-hydroxy compound with selenium dioxide as illustrated in Example 10C.

EXAMPLE 10B

*6α-difluoromethyl-17α-hydroxy-1,4-pregnadiene-3,20-dione 17-acetate (VII)*

Following the procedure of Example 10A, but employing *Corynebacterium simplex* (ATCC 6946) instead of *Septomyxa affinis*, is likewise productive of 6α - difluoromethyl - 17α - hydroxy - 1,4 - pregnadiene - 3,20 - dione 17-acetate (VII).

EXAMPLE 10C

*6α-difluoromethyl-17α-hydroxy-1,4-pregnadiene-3,20-dione 17-acetate (VII)*

A mixture of seventy milligrams of 6α-difluoromethyl-17α - hydroxy - 4 - pregnene - 3,20 - dione 17 - acetate (VIII) in 4.5 milliliters of tertiary butyl alcohol and 0.45 milliliter of acetic acid and 24-milligrams of selenium dioxide was heated to 75 degrees centigrade and stirred for 24 hours. Thereafter another 24-milligram portion of selenium dioxide was added and heated to 75 degrees centigrade and stirring continued. Thereafter the mixture was cooled, filtered to remove the selenium dioxide and evaporated. Paper chromatography showed the residue to contain 6α - difluoromethyl - 17α - hydroxy - 1,4 - pregnadiene-3,20-dione 17-acetate (VII), which is recovered from the residue by recrystallization and chromatography.

EXAMPLE 11

*6α-difluoromethyl-17α-hydroxy-4-pregnene-3,20-dione 17-acetate (VIII)*

A solution of 0.2 g. of 6α-difluoromethyl-17α-hydroxy-1,4-pregnadiene-3,20-dione-17-acetate (VII) in 5 ml. of 1 sodium hydroxide in 90% methanol and 2 ml. of methylene chloride was purged with nitrogen. After standing overnight at room temperature, the solution was diluted with methylene chloride and washed three times with water. The aqueous phases were back-extracted with methylene chloride and washed three times with water. The extracts were combined, dried and concentrated to about 2 ml. and poured onto a 15 g. chromatographic column of Florisil. After washing the column with increasing amounts of acetone in Skellysolve B, the product was eluted with 2 to 8% acetone in 1:1 mixtures of Skellysolve B and methylene chloride. Recrystallization from a mixture of acetone and Skellysolve B yielded 6α-difluoromethyl - 17α - hydroxy - 1,4 - pregnadiene - 3,20-dione (VIIa).

A medium consisting of 1% dextrose hydrate, 2% cornsteep liquor of 60% solids and tap water was adjusted to pH 4.9 with sodium hydroxide. The medium was steam sterilized at 15 pounds pressure for 30 minutes, cooled, and then inoculated with a 24-hour growth, from spores, of NRRL B–1332 (*Streptomyces sp.*). The medium was agitated, and sparged with sterile air at the rate of one-tenth volume of air per volume of medium per minute. At the end of 24 hours of fermentation at room temperature, the pH was about 7.4. To this culture there was added a solution of 6α-difluoromethyl-17α-hydroxy-1,4-pregnadiene-3,20-dione (VIIa) dissolved in a minimal amount of dimethylformamide. The solution was prepared by dissolving five parts of the steroid in 100 parts of the solvent and adding about 10 ml. of the solution per liter of the medium. Fermentation was continued for a period of 48 hours whereupon the mycelium and beer were extracted thoroughly with methylene chloride. The extract was washed with sodium bicarbonate solution and then with water, dried and concentrated in vacuo to give 6α - fluoromethyl - 17α - hydroxy - 4 - pregnene - 3,20-dione (VIIIa).

Instead of NRRL B–1332 used in Example 11 to produce fermentative hydrogenation at the 1,2-position of the steroid nucleus, other microorganisms may be similarly effectively employed; included are those chosen from the group consisting of: ATCC 6947 (*Arthobactertumescens*); ATCC 3352 (*S. olivaceous*) and ATCC 3313.

A solution composed of 1 g. of 6α-difluoromethyl-17α-hydroxy-4-pregnene-3,20-dione (VIIIa), 2.5 ml. of distilled acetic anhydride, 250 mg. of p-toluenesulfonic acid and 2.5 ml. of acetic acid was stirred at room temperature for a period of about 90 minutes. The mixture was poured with vigorous stirring into water. The precipitated solid was separated by filtration, dried, chromatographed over Florisil with increasing proportions of acetone in Skellysolve B and recrystallized from ethyl acetate to yield a light-colored crystalline solid, 6α-difluoromethyl-17α-hydroxy-4-pregnene-3,20-dione 17-acetate (VIII).

Other 17-acylates are prepared in a like manner by substituting one of the lower-hydrocarbon carboxylic acid anhydrides listed in Example 10 in place of acetic anhydride.

EXAMPLE 11A

*3,17α-diacetoxy-6α-difluoromethyl-3,5-pregnadien-20-one*

A solution of 10 g. of 6α-difluoromethyl-17α-hydroxy-4-pregnene-3,20-dione (VIIIa) in 150 ml. of acetic anhydride is stirred under nitrogen at about 40 C. with 1.5 g. of p-toluenesulfonic acid monohydrate for a period of about 10 hours. Then about 200 ml. of water is added slowly with ice-cooling and the mixture agitated until the excess acetic anhydride is destroyed. The crude crystalline precipitate is filtered, washed to neutrality with water and then washed with a small volume of methanol. This material is a mixture consisting, principally, of 3,17α-diacetoxy - 6α - difluoromethyl - 3,5 - pregnadien-20-one. Chromatography over Florisil, followed by recrystallization from a mixture of acetone and Skellysolve B (hexanes) yields a light colored, crystalline product, 3,17α-diacetoxy-6α-difluoromethyl-3,5-pregnadien-20-one.

Following the procedure of Example 11A, but substituting for acetic anhydride another lower-hydrocarbon carboxylic acid anhydride, e.g, wherein the acyl radical of the acylate group is one of those listed at the end of Example 10, yields the corresponding 3,17α-diacyloxy-6α-difluoromethyl - 3,5 - pregnadien-20-one and 3,17α-20-triacyloxy-6α-difluoromethyl-3,5,20-pregnatriene.

EXAMPLE 11B

*3,17α-diacetoxy-6α-difluoromethyl-3,5-pregandien-20-one*

A solution of 10 g. of 6α-difluoromethyl-17α-hydroxy-4-pregnene-3,20-dione 17-acetate (VIII) in 150 ml. of acetic anhydride is stirred under nitrogen with 2 g. of p-toluene-sulfonic acid monohydrate at about 40° C. for a period of about 16 hours. About 200 ml. of water is then slowly added with cooling in an ice-bath and the mixture agitated until the excess acetic anhydride is destroyed.

The crude crystalline precipitate is filtered, washed to neutrality with water and then washed with a small volume of methanol. This material is a mixture consisting, principally, of 3,17α- diacetoxy-6α-difluoromethyl-3,5-pregnadien-20-one. Chromatography over Florisil and recrystallization from a 1:1 mixture of acetone and Skellysolve B (hexanes) yields a light colored, crystalline product, 3,17α-diacetoxy-6α-difluoromethyl-3,5-pregnadien-20-one.

Following the procedure of Example 11B, but substituting for acetic anhydride another lower-hydrocarbon carboxylic acid anhydride, e.g., wherein the acyl radical of the acylate group is one of those listed at the end of Example 10, yields the corresponding 3,17α-diacyloxy-6α-difluoromethyl-3,5-pregnadien-20-one.

EXAMPLE 12

*6-difluoromethyl-17α-hydroxy-4,6-pregnadiene-3,20-dione 17-acetate (IX)*

1 g. of 6α-difluoromethyl-17α-hydroxy-4-pregnene-3,20-dione 17-acetate (VIII), 1.5 g. of recrystallized 2,3,5,6-tetrachloro-1,2-benzoquinone (chloranil) and 60 ml. of tertiary amyl alcohol were heated to boiling under nitrogen with a few boiling chips, and gently refluxed for a period of about 6 hours. The mixture was cooled and evaporated to dryness under reduced pressure. The solid residue (with the exception of some chloranil, which was insoluble) was dissolved in about 100 ml. of ether and filtered. The chloranil on the filter paper was washed with several portions of ether and the combined ether filtrates washed with 200 ml. portions of cold 2% sodium hydroxide. The ether filtrates were washed with cold water until the washings were neutral, then with saturated sodium chloride solution. The pooled ether solutions were dried over sodium sulfate and evaporated to dryness. This residue dissolved in methylene cholride was chromatographed over a 125 g. column of Florisil and eluted with fractions of Skellysolve B containing increasing proportions of acetone. The last third of the fractions were evaporated to dryness. The residue was recrystallized twice from cold methanol to yield pure light-colored crystalline 6-difluoromethyl-17α-hydroxy - 4,6 - pregnadiene-3,20-dione 17-acetate (IX).

The ester thus obtained can be hydrolyzed with potassium hydroxide or potassium carbonate in methanol or ethanol at room temperature in a nitrogen atmosphere to give free 6-difluoromethyl-17α-hydroxy-4,6-pregnadiene-3,20-dione (IXa).

A solution composed of 1 g. of 6-difluoromethyl-17α-hydroxy-4,6-pregnadien-3,20-dione (IXa), 2.5 g. of distilled acetic anhydride, 250 mg. of p-toluenesulfonic acid and 2.5 ml. of acetic acid was stirred for about 90 minutes. The mixture was poured with vigorous stirring into water. The precipitated solid was separated by filtration, dried, chromatographed over Florisil with increasing proportions of acetone in Skellysolve B and recrystallized from ethyl acetate to yield light-colored 6-difluoromethyl-17α-hydroxy-4,6-pregadiene-3,20-dione 17-acetate (IX).

Other 17-acylates are prepared in a like manner by substituting one of the lower-hydrocarbon carboxylic acid anhydrides listed in Example 10 instead of acetic anhydride.

EXAMPLE 12A

*3,17α-diacetoxy-6α-difluoromethyl-3,5,7-pregnatrien-20-one*

A suspension of 10 g. of 6α-difluoromethyl-17α-hydroxy-4,6-pregnadiene-3,20-dione 17-acetate (IX) in 150 ml. of acetic anhydride is stirred with 2 g. of p-toluenesulfonic acid monohydrate at about 40° C. for about 16 hours. About 200 ml. of water is then slowly added with cooling in an ice-bath and the mixture agitated until the excess acetic anhydride is destroyed. The crude crystalline precipitate is filtered, washed to neutrality with water and then washed with a small volume of methanol. This material consists of a mixture of, principally, 3,17α-diacetoxy-6α - difluoromethyl-3,5,7-pregnatriene-20-one and a minor quantity of 3,17α-20-triacetoxy-6α-difluoromethyl-3,5,7,20-pregnatetraene. Recrystallization from a 1:1 mixture of dichloromethane and methanol yields a light-colored crystalline product, 3,17α-diacetoxy-6α-difluoromethyl-3,5,7-pregnatriene-20-one.

Following the procedure of Example 12A, but substituting for acetic anhydride another lower-hydrocarbon carboxylic acid anhydride, e.g., wherein the acyl radical of the acylate group is one of those listed at the end of Example 10, yields the corresponding 3,17α-diacyloxy-6α-difluoromethyl - 3,5,7-pregnatriene-20-one and 3,17α,20-triacyloxy-6α-difluoromethyl-3,5,7,20-pregnatetraene.

EXAMPLE 13

*6-difluoromethyl-17α-hydroxy-1,4,6-pregnatriene-3,20-dione 17-acetate (X)*

Six 100-ml. portions of a medium in 250-ml. Erlenmeyer flasks containing 1% glucose, 2% corn steep liquor (60% solids) and tap water was adjusted to a pH of 4.9. This medium was sterilized for 45 minutes at fifteen pounds per square inch pressure and inoculated with a one to two day growth of *Septomyxa affinis* ATCC 6737. The Erlenmeyer flasks were shaken at room temperature at about 24° C. for a period of three days. At the end of this period, this 600-ml. volume was used as an inoculum for 10 l. of the same glucose-corn steep liquor medium which, in addition (contained 10 ml. of an antifoam (a mixture of lard oil and octadecanol). The fermentor was placed into the water bath, adjusted to 28° C., and the contents stirred (300 r.p.m.) and aerated (0.5 l. air per minute/10 l. beer). After seventeen hours of incubation, when a good growth developed and the acidity rose to pH 6.7, 1 g. of 6-difluoromethyl-17α-hydroxy-4,6-pregnadiene-3,20-dione (IXa) plus 0.5 g. of 3-ketobisnor-4-cholen-22-al, dissolved in 115 ml. of dimethylformamide, was added and the incubation (conversion) carried out at the same temperature and aeration for 24 hours (final pH 7.9). The mycelium was filtered off and the steroidal material was extracted with ethyl acetate to remove the bioconversion products. The ethyl acetate extract was washed with water, dried over sodium sulfate and evaporated to dryness. The residue was taken up in about 100 ml. of methylene chloride and chromatographed over a colume of 120 g. of Florisil synthetic magnesium silicate. The products were eluted from the column with mixtures of 5 to 20% of acetone in Skellysolve B. The substances eluted by 20% acetone in Skellysolve B consisted of partially purified product, which was further purified by recrystallization from acetone to give pure light-colored crystalline 6-difluoromethyl-17α-hydroxy-1,4,6-pregnatriene-3,20-dione (Xa).

A solution composed of 1 g. of 6 - difluoromethyl - 17α-hydroxy - 1,4,6 - pregnatriene - 3,20 - dione (Xa), 2.5 ml. of distilled acetic anhydride, 250 ml. of p-toluenesulfonic acid and 2.5 ml. of acetic acid was stirred for a period of about 90 minutes. The mixture was poured with vigorous stirring into water. The precipitated solid was separated by filtration, dried, chromatographed over Florisil with increasing proportions of acetone in Skellysolve B and recrystallized from ethyl acetate to yield light-colored 6 - difluoromethyl - 17α - hydroxy - 1,4,6-pregnatriene-3,20-dione 17-acetate (X).

Other 17-acylates are prepared in a like manner by substituting one of the lower-hydrocarbon carboxylic acid anhydrides listed in Example 10 in place of acetic anhydride.

EXAMPLE 14

*6-difluoromethyl-17α-hydroxy-1,4,6-pregnatriene-3,20-dione 17-acetate (X)*

A mixture of 100 milligrams of 6 - difluoromethyl-17α - hydroxy - 4,6 - pregnadiene - 3,20 - dione 17α-acetate (IX) dissolved in six milliliters of tertiary butyl alcohol and 0.55 milliliter of acetic acid was heated together with thirty milligrams of selenium dioxide to approximately 75 degrees centigrade with stirring for a period of about 24 hours. Thereafter another thirty-milligram portion of selenium dioxide was added and the mixture heated to 75 degrees centigrade under continuous stirring for a further period of 24 hours. The mixture was then cooled, filtered to remove the selenium dioxide and evaporated. The residue was chromatographed on a column of Florisil, eluted with mixtures of acetone and Skellysolve B and recrystallized from acetone-Skellysolve B hexanes four times to give pure 6 - difluoromethyl - 17α - hydroxy 1,4, 6 - pregnatriene - 3,20 - dione 17 - acetate (X), light-colored crystalline solid.

The ester thus obtained can be hydrolyzed with potassium hydroxide or potassium carbonate in methanol or ethanol at room temperature in an atmosphere of nitrogen to give free 6 - difluoromethyl - 17α - hydroxy-1,4,6-pregnatriene-3,20-dione (Xa).

A solution composed of 1 g. of 6 - difluoromethyl - 17α-hydroxy - 1,4,6 - pregnatriene - 3,20 - dione (Xa), 2.5 ml. of distilled acetic anhydride, 250 mg. of p-toluenesulfonic acid and 2.5 ml. of acetic acid was stirred for about 90 minutes. The mixture was poured into water with vigorous stirring. The precipitated solid was separated by filtration, dried, chromatographed over Florisil with increasing proportions of acetone in Skellysolve B and recrystallized from ethyl acetate to yield light-colored 6-difluoromethyl - 17α - hydroxy - 1,4,6 - pregnatriene - 3, 20-dione 17-acetate (X).

Other 17-acylates are prepared in like manner by substituting one of the lower-hydrocarbon carboxylic acids listed in Example 10 instead of acetic anhydride.

EXAMPLE 15

*6-difluoromethyl-17α-hydroxy-1,4,6-pregnatriene-3,20-dione 17-acetate (X)*

1 g. of 6α - difluoromethyl - 17α - hydroxy - 1,4-pregnadiene-3,20 - dione 17 - acetate (VII), 1.5 g. of recrystallized 2,3,5,6 - tetrachloro - 1,4 - benzoquinone (chloranil) and 60 ml. of tertiary amyl alcohol were heated to boiling under nitrogen with a few boiling chips, and gently refluxed for a period of about 6 hours. The mixture was cooled and evaporated to dryness under reduced pressure. The solid residue (with the exception of some chloranil, which was insoluble) was dissolved in about 100 ml. of ether and filtered. The chloranil on the filter paper was washed with several portions of ether and the combined ether filtrates washed with 200 ml. portions of cold 2% sodium hydroxide. The ether filtrates were washed with cold water until the washings were neutral, then with saturated sodium chloride solution. The pooled ether solutions were dried over sodium sulfate and evaporated to dryness. The residue crystallized from cold acetone to yield pure light-colored crystalline 6α-difluoromethyl - 17α - hydroxy - 1,4,6 - pregnatriene - 3, 20 - dione 17-acetate (X).

The ester thus obtained can be hydrolyzed with potassium hydroxide or potassium carbonate in methanol or ethanol at room temperature in a nitrogen atmosphere to give free 6 - difluoromethyl - 17α - hydroxy - 1,4,6-pregnatriene-3,20-dione (X).

A solution composed of 1 g. of 6 - difluoromethyl - 17α-hydroxy - 1,4,6 - pregnatriene - 3,20 - dione (Xa), 2.5 ml. of distilled acetic anhydride, 250 mg. of p-toluenesulfonic acid and 2.5 ml. of acetic acid was stirred for about 90 minutes. The mixture was poured with vigorous stirring into water. The precipitated solid was separated by filtration, dried, chromatographed over Florisil with increasing proportions of acetone in Skellysolve B and recrystallized from ethyl acetate to yield light-colored 6-difluoromethyl - 17α - hydroxy - 1,4,6 - pregnatriene - 3, 20 - dione 17-acetate (X).

Other 17-acylates are prepared in like manner by substituting one of the lower-hydrocarbon carboxylic acids listed in Example 10 for acetic anhydride.

While the compounds prepared in Examples 1 to 15 are 3,17-diacetates and 17-acetates, other 3,17-diacylates and 17-acylates of these compounds can be prepared in a similar manner by substituting as the starting material a corresponding 3,17-diacylate and 17-acylate other than the 3,17-diacetate and 17-acetate, wherein the acyl radical is, e.g., that of a lower-hydrocarbon carboxylic acid named in Example 10.

I claim:

1. A compound of the formula

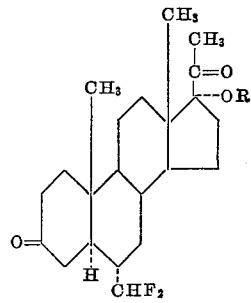

wherein R is selected from the group consisting of hydrogen and the acyl radical of a hydrocarbon carboxylic acid containing from one to twelve carbon atoms, inclusive.

2. 6α - difluoromethyl - 17α - hydroxy - 5α - pregnane-3,20-dione 17-acetate.

3. A compound of the formula

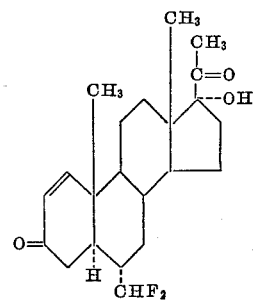

wherein R is selected from the group consisting of hydrogen and the acyl radical of a hydrocarbon carboxylic acid containing from one to twelve carbon atoms, inclusive.

4. 1 - dehydro-6α - difluoromethyl - 17α - hydroxy - 5α-pregnane-3,20-dione 17-acetate.

5. A compound of the formula

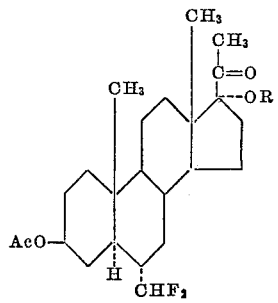

wherein Ac is the acyl radical of a hydrocarbon carboxylic acid containing from 1 to 12 carbon atoms, inclusive, and R is selected from the group consisting of hydrogen and the acyl radical of a hydrocarbon carboxylic acid containing from 1 to 12 carbon atoms, inclusive.

6. A compound of the formula

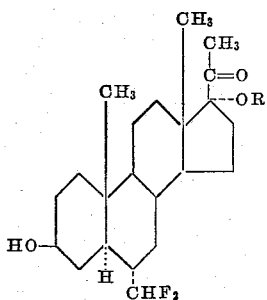

wherein R is selected from the group consisting of hydrogen and the acyl radical of a hydrocarbon carboxylic acid containing from 1 to 12 carbon atoms, inclusive.

References Cited

UNITED STATES PATENTS

| | | | |
|---|---|---|---|
| 2,837,464 | 6/1958 | Nobile | 195—51 |
| 2,844,513 | 7/1958 | Wettstein et al. | 195—3 |
| 2,900,398 | 8/1959 | Wettstein et al. | 260—397.4 |
| 2,963,493 | 12/1960 | Huffman | 260—397.4 |
| 2,963,495 | 12/1960 | Fried et al. | 260—397.5 |
| 2,971,886 | 2/1961 | Babcock et al. | 167—55 |
| 2,997,489 | 8/1961 | Ringold et al. | 260—397.45 |
| 3,007,947 | 11/1961 | Counsell | 260—397.4 |
| 3,018,296 | 1/1962 | Klimstra | 260—397.3 |
| 3,033,752 | 5/1962 | Clinton et al. | 167—74 |
| 3,036,098 | 5/1962 | Bowers et al. | 260—397.45 |

OTHER REFERENCES

Agnello et al.: J.A.C.S. 82, 4293–99 (Aug. 20, 1960).

LEWIS GOTTS, *Primary Examiner.*

M. LIEBMAN, I. MARCUS, E. ROBERTS, *Examiners.*

M. L. WILLIAMS, G. E. LANDE, *Assistant Examiners.*

UNITED STATES PATENT OFFICE
CERTIFICATE OF CORRECTION

Patent No. 3,331,863

July 18, 1967

J Allan Campbell

It is hereby certified that error appears in the above numbered patent requiring correction and that the said Letters Patent should read as corrected below.

Column 3, line 29, for "30,17α" read -- 3β,17α --; line 56, for "dihydrxoy" read -- dihydroxy --; line 75, for "acrylates" read -- acylates --; column 5, line 8, for "present" read -- presence --; column 6, line 56, for "C, 69.94" read -- C, 69.64 --; column 7, line 13, for "(II)" read -- (III) --; line 22, for "carbon)" read -- carbons) --; column 11, line 56, for "Grignard" read -- Girard --; column 12, line 12, for "wer" read -- were --; line 20, after "at" insert -- the --; column 13, line 55, for "1 sodium" read -- 1% sodium --; column 16, line 21, for "gluclose" read -- glucose --; line 30, for "addition (contained" read -- addition, contained --; column 18, lines 35 to 48, for that portion of the formula reading "-----OH" read -- -----OR --.

Signed and sealed this 3rd day of December 1968.

(SEAL)
Attest:

EDWARD M. FLETCHER, JR.
Attesting Officer

EDWARD J. BRENNER
Commissioner of Patents